United States Patent [19]

Hall

[11] 4,380,868
[45] Apr. 26, 1983

[54] TUBE LOADING APPARATUS

[75] Inventor: Robert E. Hall, Dayton, Ohio

[73] Assignee: United Aircraft Products, Inc., Dayton, Ohio

[21] Appl. No.: 248,717

[22] Filed: Mar. 30, 1981

[51] Int. Cl.³ .................... B23P 19/04; B23P 15/26
[52] U.S. Cl. ................................. 29/726; 29/33 G; 29/252; 29/281.5
[58] Field of Search ........ 29/726, 727, 33 G, 157.3 B, 29/157.4, 240, 252, 281.4, 282, 281.5

[56] References Cited

U.S. PATENT DOCUMENTS

| | | | |
|---|---|---|---|
| 3,126,103 | 3/1964 | Postlewaite et al. | 29/726 |
| 3,421,199 | 1/1969 | Swanson | 29/726 |
| 3,789,479 | 2/1974 | Zifferer et al. | 29/726 |
| 3,867,752 | 2/1975 | Tachibana et al. | 29/726 |

Primary Examiner—Daniel C. Crane
Attorney, Agent, or Firm—J. E. Beringer

[57] ABSTRACT

Apparatus in generally unitary machine form for the mechanical, automatic installation of tubes in an assembly of header plates and baffles to produce a tubular heat exchanger core or the like. Tubes are inserted one at a time in perforate parts held in a holding fixture with a mounting table and the holding fixture being capable of movement in different senses. A tube delivery arrangement features a tube support which can be rocked into and out of a support position. A guide rod is compelled to a rotary motion in its entrance into and alignment of the perforate parts.

8 Claims, 6 Drawing Figures

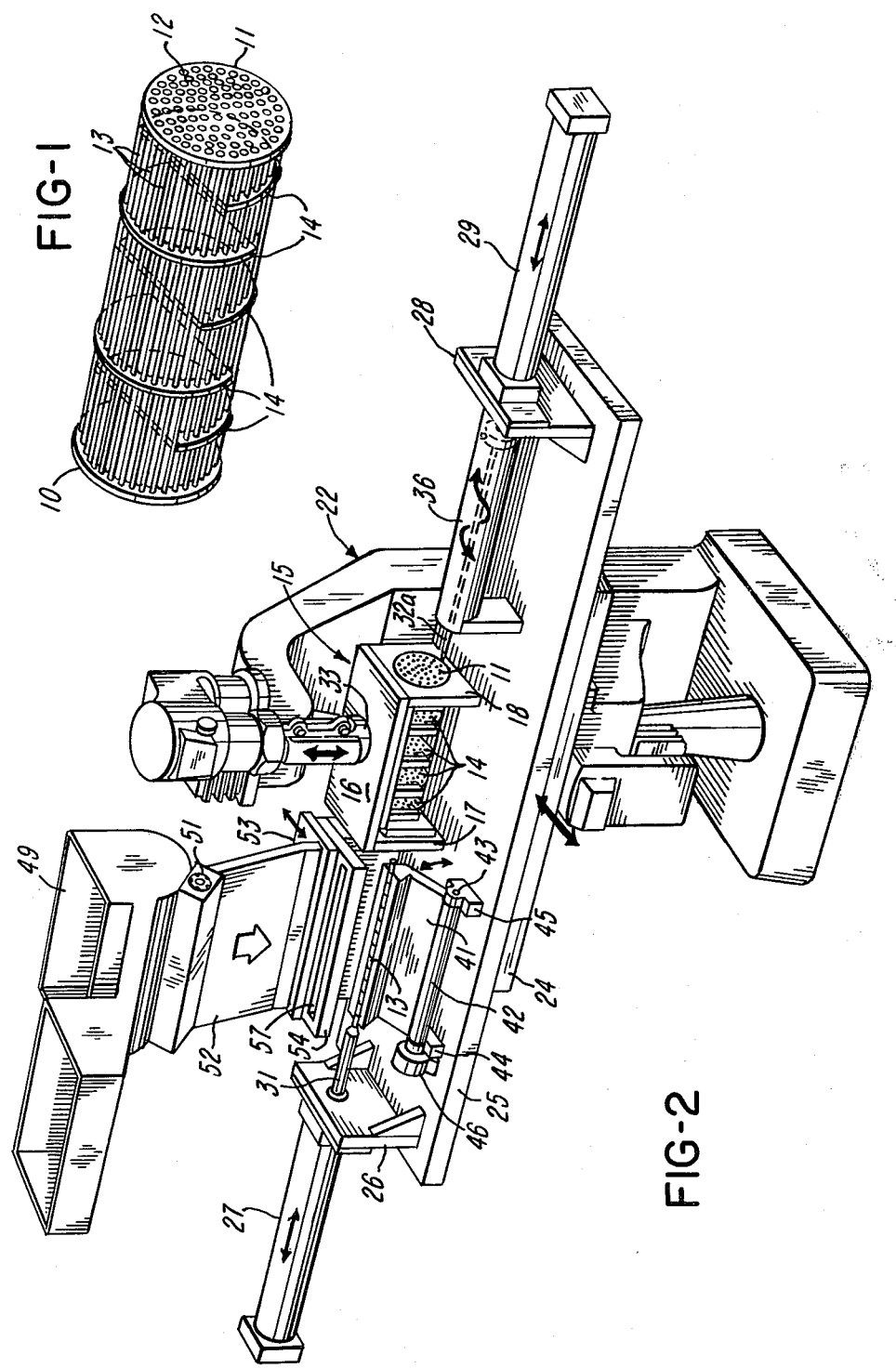

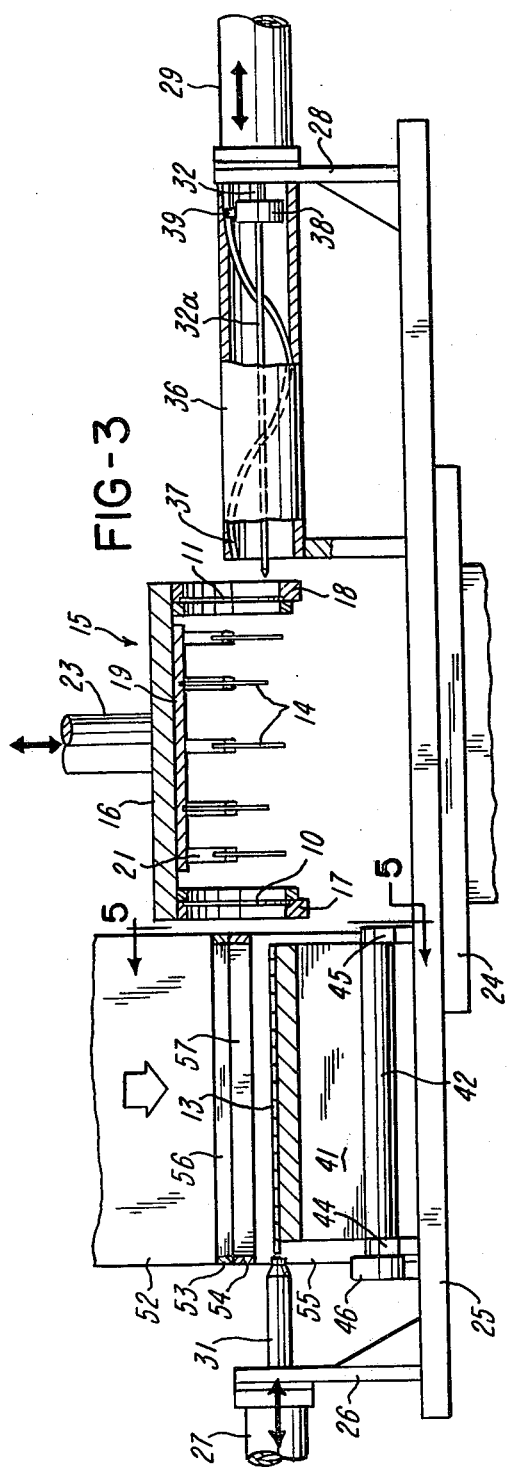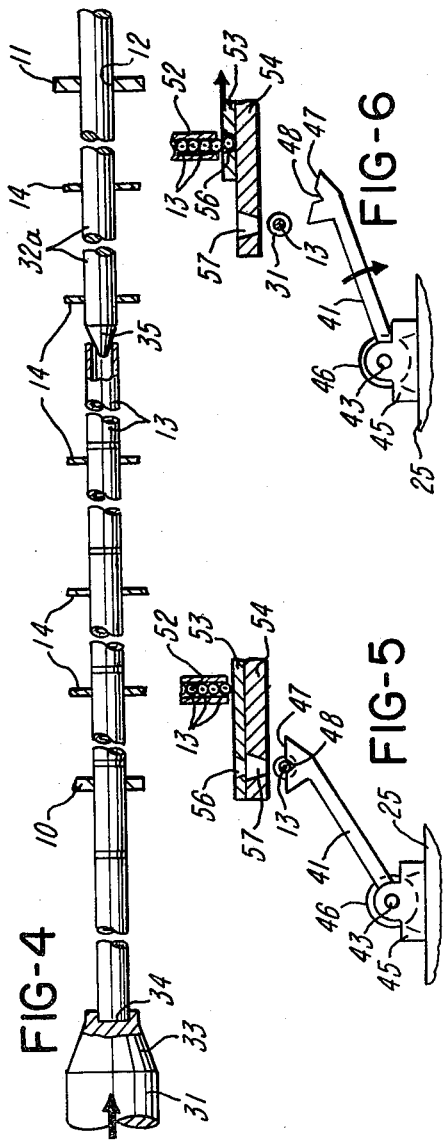

TUBE LOADING APPARATUS

BACKGROUND OF THE INVENTION

This invention relates to tube loading apparatus and particularly to the loading of small diameter tubes into correspondingly sized apertures in plate and baffle elements, as for example in the assembly of compact, light weight, high performance heat exchangers in which the tubes are subsequently fixed to accommodating header plates in a brazing or like operation.

It has been known heretofore mechanically to load tubes into a tubular heat exchanger, but this has been in conjunction with relatively large size tubes accommodated in header plates with relatively large clearance. A prior art machine is large and complex and is especially constructed and designed for its intended use and provides a support table which attempts to incorporate in itself the compound movement needed to load successive, relatively off-set, rows of tubes. Further, in trying simultaneously to load an entire row of tubes at a time, the prior art machine substantially excludes itself from that which is possible of attainment in dealing with high density, light weight heat exchangers. In this latter branch of the heat exchanger art, therefore, it has been the practice to load or install tubes as a hand operation. While costly, the hand operation obviates mishaps and errors which can lead to excessive scrapping of parts and materials, and avoids the necessity of building or purchasing the relatively complex machinery available in the prior art. In a brazed heat exchanger, moreover, minimal clearance is permissible between the tubes and aperture walls in which the tubes are received since these joints must be sealed by flowing braze alloy. The luxury of wide clearances at these joints, which would greatly simplify assembly, is not available.

SUMMARY OF THE INVENTION

The present invention provides relatively simple tube loading apparatus, it being proposed to utilize the structure and operational modes of an existing conventional machine tool, for example, a milling machine. In adopting such a machine to present purposes, the machine spindle is used as a mount for a holding fixture and its motion is limited to movement in a vertical sense. The machine table has power cylinders, tube supports and tube feeding means mounted thereon and its movement in a horizontal sense is combined with vertical motion of the spindle to accomplish the compound movement required to present each successive tube position for loading. Tubes are installed one at a time under precise, positive operating conditions. A tube support has an oscillatory mount enabling it to position a tube in alignment with push and guide rods and to be rocked out of a support position while a tube is actually being pushed into place in the fixture. Axial motions of the guide rod are accompanied by rotary movements thereof about its own longitudinal axis to reduce frictional drag in its travel through the perforate plate elements. The arrangement in general is one that can make possible use of the push and guide rod principle in connection with braze type heat exchangers characterized by close clearances and dense, compact constructions.

An object of the invention is to provide tube loading apparatus characterized substantially as in the foregoing.

Other objects and structural details of the invention will appear more clearly from the following description, when read in connection with the accompanying drawings, wherein:

FIG. 1 is a view in perspective, and partly diagrammatic, of a tubular heat exchanger core as assembled by an apparatus according to the present invention;

FIG. 2 is a view in perspective of tube loading apparatus in accordance with the illustrated embodiment of the invention;

FIG. 3 is a fragmentary view in side elevation, partly broken away, of the apparatus of FIG. 2;

FIG. 4 is a detail view, showing a tube in the process of being assembled into a heat exchanger core;

FIG. 5 is a detail view showing a tube support means positioning a tube for assembly; and FIG. 6 is a view like FIG. 5, showing the tube support means rocked out of the path of movement of the tube push rod.

Referring to the drawings, apparatus in accordance with the invention operates to assemble a tubular heat exchanger core of the kind illustrated in FIG. 1. As there indicated, longitudinally spaced apart header plates 10 and 11 have multiple rows of apertures 12 accommodating respective ends of thin-walled heat transfer tubes 13. Positioning intermediately of the header plate 10 and 11 is a longitudinal series of baffle plates 14. The header plates 10 and 11 are circular in configuration. The baffles 14 are similarly configured but have a truncated construction and are so arranged relative to one another that adjacent baffles have truncated portions extending oppositely of one another. As will be understood, what may be termed a tube side fluid has access to an exterior face of a header plate 10 or 11 and flows longitudinally through the tubes 12, while what may be termed a shell side fluid has access to the space between plates 10 and 11 and is guided by the baffle members 14 in a circuitous path taking it repeatedly over successive portions of the tube exteriors. A transfer of heat takes place through the tube walls from the fluid of higher temperature to the fluid of lower temperature.

In assembling the core of FIG. 1, a holding fixture 15 (FIG. 2) is used temporarily to fix the positions of header plates 10–11 and of baffles 14, while tubes 13 are being installed. Such installation involves a pushing or threading of the tubes through aligning apertures in the plates 10 and 11 and through correspondingly aligning apertures in at least certain of the baffle members 14. The heat exchanger core of FIG. 1 is a device of the compact, light weight, high performance type in which tube-to-plate joints are sealed in a brazing process. To insure the success of the brazing process, the apertures 12 are drilled to approximately the same diameter as the tube outside diameters. Tube-to-baffle joints may likewise be brazed but in any event the apertures in the baffles accommodating passage of the tubes therethrough must provide but slight clearance around the tubes in order to avoid bypassing flow.

The fixture 15 can take various forms and is only diagrammatically indicated herein. Thus, it may comprise an upper plate 16, end plates 17 and 18 and a lamination 19 to the underside of plate 16 from which depend a series of longitudinally spaced apart fingers 21. Plates 17 and 18 have recessed seats respectively accommodating header plates 10 and 11 while dependent fingers 21 appropriately mount the baffle members 14. As mounted in the holding fixture 15, corresponding rows of apertures in the header plates and in the baffle members align with one another.

The tube loading apparatus of the invention essentially embodies in a conventional milling type machine tool 22 only portions of which are here shown for convenience. The machine tool spindle 23 is fixed in a suitable way to the upper plate 16 of holding fixture 15 so that vertical movements of the spindle are partaken of by the holding fixture. The machine table 24 has, in accordance with the present invention, superposed thereon another relatively laterally extended table 25. Tables 24–25 form an assembly orienting in a sense perpendicular to the spindle 23 and moveable from front to back or in a horizontal sense relative thereto.

Toward its one end, table 25 has an upright support member 26 fixed thereto serving as a mount for a hydraulic cylinder 27. Toward the opposite end of the table 25 is a like upright member 28 providing a mount for a hydraulic cylinder 29. The cylinders 27 and 29 mount coaxially of one another and include respective rods 31 and 32 (FIG. 3) extensible and retractable toward and away from one another through appropriate openings in the respective uprights 26 and 28. For reasons which will hereinafter more clearly appear, rod 31 is identified as a push rod and rod 32 is identified as a guide rod. Push rod 31 terminates, as shown in FIG. 4, in a tapered nose portion 33 having a truncated extremity in which is a recess 34. The diameter of recess 34 is approximately the same as the outside diameter of a tube 13. Rod 32, as it projects through upright member 28 joins in a universal type connection (not shown) to a relatively reduced diameter rod extension 32a terminating at an outer end in a needle nosed portion 35. The diameter of rod extension 32a is the same or substantially the same as the outside diameter of a tube 13. The power cylinders 27 and 29 orient to opposite sides of the spindle 23 which accordingly positions the holding fixture 15 intermediately of the power cylinders and of the push and guide rods projected therefrom. In a normal attitude thereof, the holding fixture locates the plate and baffle elements mounted therein approximately in the line with the projected push and guide rods. A table mounted cylinder extension 36 surrounds guide rod 32a and has a curvilinear groove 37 therein. A boss-like member 38 is fixed to rod 32a, inside cylinder extension 36, and has a radially projecting pin 39 received in groove 37. In accordance with the construction and arrangement of parts, longitudinal reciprocation of the guide rod assembly 32–32a, is accompanied by a rotary motion of rod extension 32a about its longitudinal axis.

A tube support mechanism locates intermediately of the push rod 31 and the spindle 23. The tube support means includes an arm 41 which at its one end terminates in a sleeve 42 fixed to a shaft 43, the latter being mounted in bearing blocks 44 and 45 resting in a fixed position on the table 25. At its one end, shaft 43 projects beyond bearing block 44 and into a rotary solenoid 46 stationarily mounted on the table 25. Arm 41 is a relatively broad member which at its end opposite its end sleeve 42 is expanded and provides a flat planar surface 47. In the surface 47 is a longitudinal groove 48. As indicated, surface 47 and groove 48 therein provide a resting place for a tube 13, it being the purpose of the tube support member 41 to position a tube 13 in axial alignment with the push and guide rods 31 and 32–32a. Means are provided to feed tubes one at a time to the tube support member 41. If desired, such feed mechanism can be the same as or like that disclosed in Andrews et al U.S. Pat. No. 3,297,200 issued Jan. 10, 1967. Such a mechanism has been illustrated here and includes a hopper to hold a supply of tubes 13. A grooved roller 51 accepts tubes from the bottom of hopper 49 and deposits them one at a time into a chute 52 in which tubes are confined against anything other than gravity-induced downward movement. As indicated in FIGS. 5 and 6, a series of vertically stacked tubes 13 in chute 52 rest on the upper surface of a slide plate 53. The latter in turn rests on a fixed plate 54 which is a part of an upright wall 55 stationarily mounted on table 25. Plate 53 is adapted to be reciprocated, by a means which is unnecessary here to consider, between positions shown in FIGS. 5 and 6. An aperture 56 is brought alternately to a position underlying chute 52 (FIG. 6) and to a position overlying a like aperture 57 in plate 54 (FIG. 5). As will be evident, the result of such operation is that slide 53 accepts a tube from chute 52 when in the FIG. 6 position, and, when in the FIG. 5 position, allows such a tube to drop through the aperture 57 onto the surface 47 of the tube support member. Repeated reciprocatory movements of the slide 53 results in successive tubes being deposited one at a time on the surface 47. Support member 41 has a rocking motion, under the influence of rotary solenoid 46, from a position as shown in FIG. 5 to a position as shown in FIG. 6 and back again. This motion, occurring in a timed relation to actuation to the power cylinders and to movement of the slide 53 provides that the support member 41 always is in position to receive a dropped tube 13 but is out of the way of push rod 31 when this member advances to insert a tube into the perforate parts held in the holding fixture 15.

In the operation of the apparatus, and assuming a tube 13 to have been deposited in a groove 48 on tube support member 41, a first step of an operation involves the energizing of power cylinder 29 to project guide rod means 32–32a. In response thereto, the needle nose of rod extension 32a enters an aligned aperture 12 in header plate 11, and, in a continuing motion, the guide rod extension is moved through other aligning, corresponding apertures in baffles 14 and in the opposite end plate 10. Beyond plate 10, the needle nose of the rod extension 32a enters and limits against an adjacent end of the tube 13 supported on surface 47. Concomitantly with the engagement of tube 13 by the guide rod, power cylinder 27 is energized and push rod 31 advances to seat the opposite end of tube 13 into the recess 34 at the push rod extremity. The tube is at this time securely held between the opposing rods 31 and 32a and solenoid 46 is activated to rock lever 41 out of the way of the advancing push rod, as to a position substantially as shown in FIG. 6. At about the same time, power cylinder 29 is de-energized, allowing push rod 31 to act through the tube 13 to force rod 32a in a retracting direction. This motion continues with the tube 13 following a retracting rod extension 32a and being guided thereby through the aligning apertures in plates 10 and 11 and baffles 14. When the rod 31 has reached the limit of its forward movement, at which time the tube 13 is fully and properly installed between the plates 10 and 11, both cylinders 27 and 29 are energized positively to retract their respective rods and support member 41 is allowed to return from its FIG. 6 position to its FIG. 5 position, preparing the apparatus for a next succeeding operation. Further in preparation for such operation, the table 25 is given an increment of movement forwardly or backwardly to bring a next succeeding header plate aperture into alignment with the rods 31-32. The operation of the apparatus continues in this manner with tubes installed in the apertures of each header plate row and with adjustment being made by vertical movement of the spindle 23 to move from one row of apertures to a next adjacent row.

Automatic milling machines of the kind that can be adapted for the use of this invention comprise a programmable operating system by which movements of the table 25 and the spindle 23 may be set to occur in a predetermined pattern. Thus, once the hopper 49 has been filled with tubes, and a switch actuated to put the machine in operation, an entire heat exchanger core can be assembled without stopping, single tubes being successively installed in the tube positions of each row and with the machine indexing automatically from row to row. When installation of the tubes is complete, the fixture 15 can be removed from the machine, disassembled, and the fabricated core subjected to a brazing or like operation in which the tubes are affixed within the apertures 12, as well as within the apertures of the baffles 14 if provision has been made for the latter. The operations of energizing and de-energizing power cylinders 27 and 29, activating solenoid 46 and effecting reciprocation of slide 53 may be effected in any suitable manner and it is thought unnecessary to burden the disclosure with illustrations and descriptions of pumps, motors, electrical circuits, switches and the like. It is thought that it will be sufficient to repeat that the several described mechanisms are operated in a timed relation to one another, as for example through a use of limit switches and the like, to effect the described operations in the order described.

There has been disclosed but a single embodiment of the invention apparatus. It will be understood that the invention is thought to and does comprehend in its scope alternative constructions and modifications that would suggest themselves to persons skilled in the art.

What is claimed is:

1. Apparatus for loading tubes one at a time into header and baffle members formed with rows of perforations and assembled in a holding fixture to complete a tubular core of a heat exchanger or the like, including a table movable in a first sense in increments corresponding to the distance between adjacent perforations of a row of perforations, means for moving said table in said increments, single opposing power cylinders mounted on said table, said cylinders projecting respective aligned extensible and retractable guide and push rods therefrom, means for movably supporting a holding fixture intermediately of said rods and independently of said table for movement in a second sense substantially at right angles to table movements and in increments each corresponding to the distance between adjacent rows of perforations, whereby said rods may be aligned with successive perforations of a row of perforations by a movement of said table incrementally in said first sense and with successive rows by a movement of said fixture incrementally in said second sense, tube support means intermediately of said push rod and said fixture providing a resting place for a tube to align with said rods, and means for delivering tubes one at a time to said support means.

2. Appartaus according to claim 1, wherein said holding fixture is supported in an overlying relatively elevated relation to said table.

3. Apparatus according to claim 2, wherein said apparatus is comprised in a machine tool having a work supporting machine table incrementally movable in a horizontal sense and a machine spindle overlying said table and incrementally movable in a vertical sense, in which the machine table mounts said power cylinders and said tube support means, said means for supporting a holding fixture being comprised in the machine spindle.

4. Apparatus according to claim 1, wherein means mounted on said table moves said support means into and out of a position to receive a delivered tube in which position a delivered tube is aligned for end engagement by said rods.

5. Appartus according to claim 4, wherein said tube support means has the form of a lever, said means for moving said tube support means including a rotary solenoid for effecting to and fro rocking motion of said lever.

6. Apparatus according to claim 4, said tube support means comprising a groove surface in which a tube positions to align with said rods and said means to move said tube support means operating to remove said grooved surface from a supporting relation to a tube thereon upon the tube being engaged by said rods.

7. Apparatus according to claim 1, wherein all of said power cylinders, said tube support means and said tube delivery means are mounted on said table for unison movement therewith and relative to said means supporting said holding fixture.

8. Apparatus as in claim 7, said table being movable in a horizontal sense and said spindle being movable in a vertical sense, the two movements cooperating for an automatic positioning and repositioning of the parts in an automatic loading of successive tubes into successive tube positions in a header and baffle assembly.

* * * * *